(12) United States Patent
Sisman

(10) Patent No.: US 11,277,316 B2
(45) Date of Patent: Mar. 15, 2022

(54) TESTING AND MAINTAINING OUTAGE RESILIENCE OF SERVER RESOURCES

(71) Applicant: AMADEUS S.A.S., Biot (FR)

(72) Inventor: Goekhan Sisman, Erding (DE)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 17/104,233

(22) Filed: Nov. 25, 2020

(65) Prior Publication Data

US 2021/0160146 A1 May 27, 2021

(30) Foreign Application Priority Data

Nov. 27, 2019 (FR) ...................................... 1913294

(51) Int. Cl.
*G06F 11/00* (2006.01)
*H04L 41/14* (2022.01)
(Continued)

(52) U.S. Cl.
CPC .......... *H04L 41/145* (2013.01); *G06F 11/008* (2013.01); *G06F 11/3006* (2013.01);
(Continued)

(58) Field of Classification Search
CPC ............... G06F 11/008; G06F 11/3006; G06F 11/3457; G06F 11/3003; G06F 11/3024; G06F 11/3409; G06F 11/3442; G06F 11/3466; H04L 41/145; H04L 41/0816; H04L 41/08; H04L 41/0803;
(Continued)

(56) References Cited

U.S. PATENT DOCUMENTS 10,103,956 B2 * 10/2018 Niestemski ......... H04L 43/0817
2012/0233328 A1 * 9/2012 Iyoob .................... G06F 9/5061
709/226
(Continued)

FOREIGN PATENT DOCUMENTS

WO WO-2013055538 A1 4/2013

OTHER PUBLICATIONS

Colman-Meixner, Carlos, Chris Develder, Massimo Tornatore, and Biswanath Mukherjee. "A survey on resiliency techniques in cloud computing infrastructures and applications." IEEE Communications Surveys & Tutorials 18, No. 3 (2016): 2244-2281. (Year: 2016).*

(Continued)

*Primary Examiner* — Anthony J Amoroso
(74) *Attorney, Agent, or Firm* — Perry + Currier, Inc.

(57) ABSTRACT

A computer-implemented method and system of testing and maintaining outage resilience of server resources of a server infrastructure by means of a hybrid simulation is presented. The server infrastructure comprises a plurality of servers executing a plurality of applications and the method comprises measuring a processor utilization for each of the servers of the server infrastructure, determining a resilience ratio of the server infrastructure by simulating the outage of at least one of the servers based on the measured processor utilization, and in response to the resilience ratio of the server infrastructure falls below a resilience threshold, initiating an assignment of additional resources for executing at least one of the plurality of applications to the server infrastructure.

15 Claims, 12 Drawing Sheets

(51) Int. Cl.
   *G06F 11/30* (2006.01)
   *G06F 11/34* (2006.01)
   *H04L 41/0816* (2022.01)
   *H04L 43/0876* (2022.01)
   *H04L 67/10* (2022.01)

(52) U.S. Cl.
   CPC ...... *G06F 11/3024* (2013.01); *G06F 11/3457* (2013.01); *H04L 41/0816* (2013.01); *H04L 43/0876* (2013.01); *H04L 67/10* (2013.01)

(58) Field of Classification Search
   CPC ............. H04L 41/0813; H04L 41/0823; H04L 41/0836; H04L 41/14; H04L 41/142; H04L 43/0876; H04L 43/08; H04L 67/10; H04L 67/1002; H04L 67/1004; H04L 67/1008; H04L 43/50
   See application file for complete search history.

(56) References Cited

U.S. PATENT DOCUMENTS

2017/0060635 A1  3/2017  Wu et al.
2017/0337083 A1  11/2017  Wu et al.
2019/0129813 A1  5/2019  Sankarasubramanian et al.

OTHER PUBLICATIONS

Bauer, Eric, and Randee Adams. Reliability and availability of cloud computing. Chapters 3-6, pp. 29-131. John Wiley & Sons, 2012. (Year: 2012).*

* cited by examiner

| fire cell | A | | | B | | C | | | |
|---|---|---|---|---|---|---|---|---|---|
| server | A1 | A2 | A3 | B1 | B2 | C1 | C2 | C3 |
| processor utilization | 30 | 40 | 45 | 25 | 35 | 10 | 75 | 60 |
| utilized processor units | 115 | | | 60 | | 145 | | |
| outage | | | | server B1 and B2 | | | | |
| simulated processor utilization | 53.3 | 53.3 | 53.3 | | | 53.3 | 53.3 | 53.3 |
| resilience ratio | | | | 46.7 | | | | |

250

251 fire cell
252 server
253 processor utilization
254 utilized processor units
255 outage
256 simulated processor utilization
257 resilience ratio

Fig. 2b

Table 360 (day 4):

| day 4 | A1 | A2 | A3 | B1 | B2 |
|---|---|---|---|---|---|
| t1 1 | 61.68 | 75.41 | 56.84 | 33.15 | 67.84 |
| t1 2 | 56.29 | 73.59 | 80.65 | 61.11 | 81.81 |
| t1 3 | 53.08 | 46.10 | 62.25 | 29.71 | 41.25 |
| t1 4 | 89.64 | 34.14 | 43.04 | 36.09 | 69.92 |
| ... | 34.29 | 80.92 | 55.92 | 25.85 | 34.78 |
| ... | 48.29 | 76.60 | 86.68 | 27.02 | 50.89 |
| t1 n | 28.52 | 56.07 | 58.39 | 18.93 | 51.22 |
| Maximum | 89.64 | 80.92 | 86.68 | 61.11 | 81.81 |

Table 370 (week 15):

| week 15 | A1 | A2 | A3 | B1 | B2 |
|---|---|---|---|---|---|
| day 1 | 29.69 | 23.05 | 71.37 | 35.82 | 44.33 |
| day 2 | 68.71 | 47.12 | 84.80 | 42.34 | 44.86 |
| day 3 | 22.74 | 19.90 | 34.63 | 76.88 | 36.60 |
| day 4 | 89.64 | 80.92 | 85.14 | 61.11 | 81.81 |
| day 5 | 39.62 | 72.34 | 83.65 | 31.66 | 89.81 |
| day 6 | 36.02 | 23.06 | 33.55 | 42.41 | 58.65 |
| day 7 | 56.94 | 85.44 | 45.97 | 80.18 | 63.58 |
| Maximum | 89.64 | 85.44 | 85.14 | 80.18 | 89.81 |

Fig. 3c

| fire cell | A | | | B | | C | | | |
|---|---|---|---|---|---|---|---|---|---|
| server | A1 | A2 | A3 | B1 | B2 | C1 | C2 | C3 |
| # reference servers (installed capacity) | 5 | 4 | 5 | 6 | 8 | 7 | 4 | 4 |
| processor utilization | 30 | 40 | 45 | 25 | 35 | 10 | 75 | 60 |
| # fully utilized reference servers (used capacity) | 2 | 2 | 3 | 2 | 3 | 1 | 3 | 3 |
| # fully utilized reference servers | 7 | | | 5 | | 7 | | |
| outage | | | | server B1 and B2 | | | | |
| simulated processor utilization | 65.5 | 65.5 | 65.5 | 34.5 | | 65.5 | 65.5 | 65.5 |
| resilience ratio | | | | | | | | |

Fig. 5c

| fire cell | A | | | B | | C | | |
|---|---|---|---|---|---|---|---|---|
| server | A1 | A2 | A3 | B1 | B2 | C1 | C2 | C3 |
| application | I | II | III | II | I | I | III | III |
| # reference servers (installed capacity) | 5 | 4 | 5 | 6 | 8 | 7 | 4 | 4 |
| processor utilization | 30 | 40 | 45 | 25 | 35 | 10 | 10 | 60 |
| HT factor | 1.95 | 1.72 | 1.55 | 2.0 | 1.85 | 1.6 | 1.6 | 1.2 |
| utilized processor units with HT factor | 58.5 | 68.8 | 69.75 | 50 | 64.75 | 16 | 16 | 72 |
| # fully utilized reference servers (used capacity) | 3 | 3 | 4 | 3 | 6 | 2 | 1 | 3 |
| outage | | | | server B1 and B2 | | | | |
| simulated processor utilization/application I | 91.7 | | | | | 91.7 | | |
| simulated processor utilization/application II | | 112.5 | | | | | | 112.5 |
| simulated processor utilization/application III | | | 55.6 | | | | 55.6 | |
| resilience ratio/appl. | application I: 8.3 - application II: -12.5 - application III: 44.4 | | | | | | | |
| resilience ratio | -12.5 | | | | | | | |

Fig. 8

TESTING AND MAINTAINING OUTAGE RESILIENCE OF SERVER RESOURCES

TECHNICAL FIELD

The invention generally relates to computers and computer software, and in particular to methods, systems, and computer programs for testing and maintaining outage resilience of server resources of a server infrastructure by means of a hybrid simulation.

BACKGROUND

The reliability of complex computational infrastructures, such as large IT infrastructures or data centers, plays a key role in contemporary information and computing technology. One factor influencing the reliability of such infrastructure systems is the ability to compensate partial disruptions and failures of system components even in case of complex failures and multiple outages. This ability, which is crucial for ensuring processing continuity, is called "resilience" and is defined by the system's tolerance against disruptions.

Current Disaster-Recovery Solutions (DR-Solutions) include a wide range of protective measures to intercept system failures—such as high availability (HA) infrastructures, functional independency of components, and recovery techniques—and preventive measures to minimize the risk of a complete system brake down—such as planning and conceptual design, continual risk identification, and assessment as well as continuity strategies.

A great plurality of parameters and system-components as well as a plurality of different individual applications render complex IT infrastructures to be of non-deterministic behavior, which also affects the failure behavior of the system. In case of single or simple failures, the system can be automatically or manually restored by using redundant storage. However, in case of complex failures—e.g. simultaneous breakdown of redundant components, data corruption, non-booting clusters or massive unrecoverable software failures—or disaster situations—e.g. large-scale power failure, plane crash or fire inside the IT-infrastructure—simple restoring techniques will fail. Thus, preventive and recurrently obtained measures that take the current and historical state of the system into consideration are required to provide a meaningful basis for increase the reliability in such non-deterministic environments.

SUMMARY

According to a first aspect of the invention, a computer-implemented method of testing and maintaining outage resilience of server resources of a server infrastructure by means of a hybrid simulation is presented. The server infrastructure comprises a plurality of servers executing a plurality of applications and the method comprises measuring a processor utilization for each of the servers of the server infrastructure, determining a resilience ratio of the server infrastructure by simulating the outage of at least one of the servers based on the measured processor utilization, and in response to the resilience ratio of the server infrastructure falls below a resilience threshold, initiating an assignment of additional resources for executing at least one of the plurality of applications to the server infrastructure.

In an embodiment, the resilience ratio is determined for each of the executed applications separately. In another embodiment, the servers are located in at least two different fire cells. In yet another embodiment, the servers are located in at least two distant locations.

In another embodiment, measuring a processor utilization of a server comprises measuring a processor utilization of a server during a time interval, averaging the processor utilization of the server for the time interval, storing the processor utilization of the server for a plurality of time intervals, and returning the maximum processor utilization stored as the processor utilization of the server.

In another embodiment, at least one server of the server infrastructure has the capability to use hyperthreading and hyperthreading is turned-on on the at least one server, and measuring a processor utilization of a server comprises applying a hyperthreading factor on the measured processor utilization of the server. In a further embodiment, the hyperthreading factor is determined from a hyperthreading reference curve, wherein the hyperthreading reference curve is determined based on measuring a processor utilization on a test server with hyperthreading turned-off and a processor utilization on the test server with hyperthreading turned-on while the test server executes equal tasks.

In another embodiment, at least two servers are differently equipped with regard to at least one of central processing unit, graphic processing unit, memory capacity, and memory type, and the method further comprises determining a number of reference servers for each server with regard to processing capacities and transforming each measured processor utilization to a number of fully utilized reference servers. In a further embodiment, the number of reference servers for a server is rounded off to the next lower integer number and the number of reference servers for a processor utilization of a server is rounded up to the next higher integer number.

In another embodiment, the resilience ratio is a resulting unused processor utilization of remaining servers when executing the load of at least one of the plurality of applications. In yet another embodiment, initiating an assignment of additional resources for executing at least one of the plurality of applications to the server infrastructure comprises determining the amount of resources required to keep the resilience ratio over the resilience threshold, and assigning the determined amount of resources to the server infrastructure.

In another embodiment, the method further comprises, in response to the resilience ratio exceeding an underutilization threshold, initiating an assignment of resources from the server infrastructure to another server infrastructure. In yet another embodiment, simulating the outage of at least one server is performed for a plurality of outage scenarios and the resilience ratio of the server infrastructure is the lowest value of the resilience ratios of the plurality of outage scenarios.

According to a second aspect of the invention, a system of testing and maintaining outage resilience of server resources of a server infrastructure is presented, wherein the server infrastructure comprises a plurality of servers executing a plurality of applications and wherein the system is at least indirectly connected to all servers of the server infrastructure and arranged to fulfil the method described herein.

According to a third aspect of the invention, a computer program is presented that comprises instructions which, when the program is executed by a computer, cause the computer to carry out the method described herein.

BRIEF DESCRIPTION OF THE DRAWINGS

The subsequent description of embodiments is based on the accompanying set of figures, in which similar reference numerals refer to similar elements and in which:

FIG. 2b depicts example values determined by the described method for the server infrastructure of FIG. 1;

FIG. 3b depicts graphs with example values measured with the method of FIG. 3a;

FIG. 3c two tables with example values measured with the method of FIG. 3a;

FIG. 5c depicts example values based on reference servers for the server infrastructure of FIG. 1;

FIG. 8 depicts example values of different executed applications for the server infrastructure of FIG. 1.

The drawings and the description of the drawings are of embodiments of the invention and not of the invention itself.

DETAILED DESCRIPTION

As already stated above, the invention relates to methods, systems, and computer programs for testing and maintaining outage resilience of server resources of a server infrastructure by means of a hybrid simulation.

Figure 1:
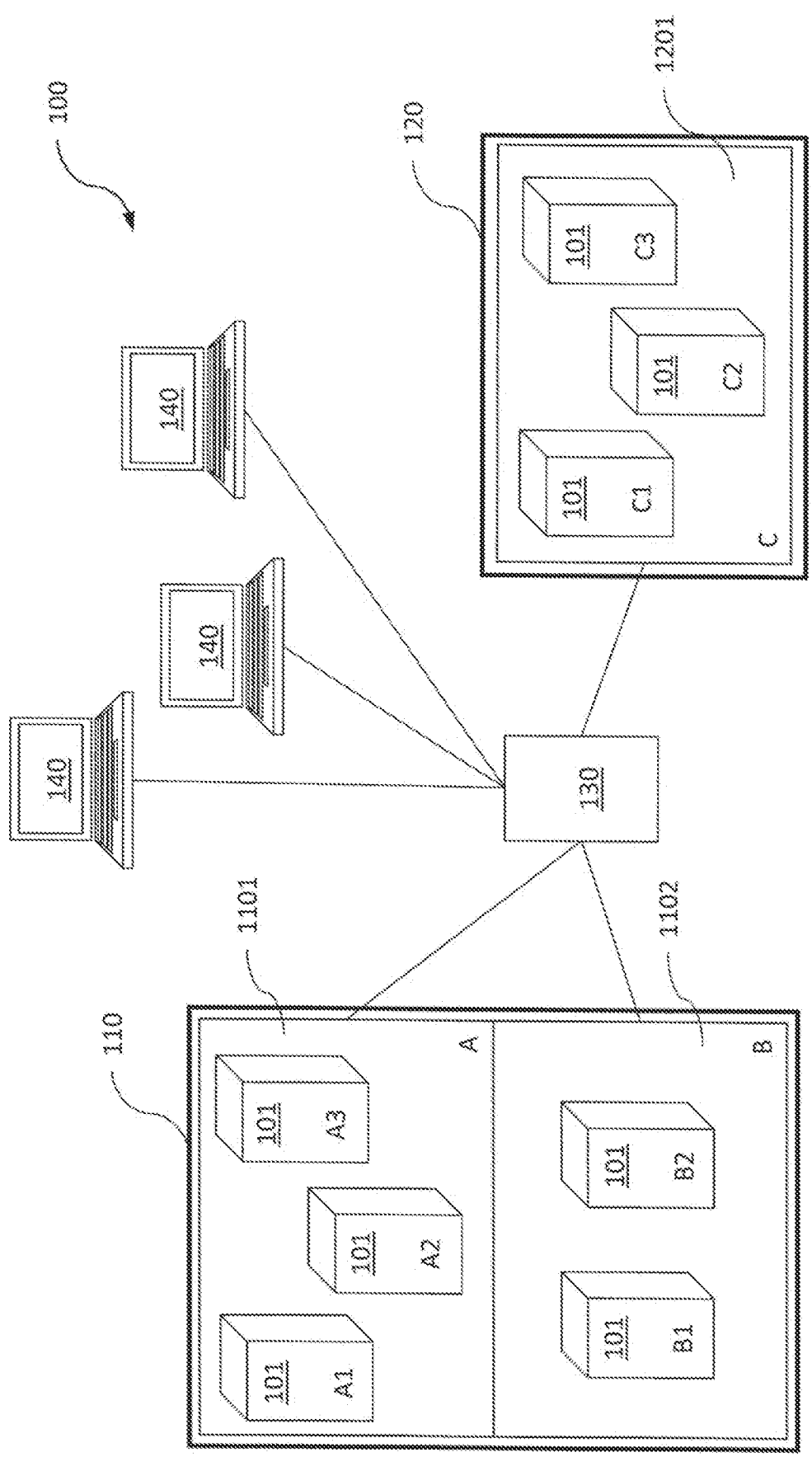
FIG. 1 depicts an example of a possible server infrastructure according to the invention.

FIG. 1 presents a server infrastructure 100 according to the invention. The server infrastructure 100 comprises a plurality of servers 101 that execute a plurality of applications. The servers 101 are located in two remote server farms 110 and 120 and in different fire cells 1101, 1102, and 1201. Fire cells are separate server rooms that are protected by different measures in case of fire. They ensure that a fire outside of a fire cell does not affect the servers inside the fire cell and that a fire inside of a fire cell does not spread to other fire cells. The servers 101 may be virtual servers, wherein a plurality of virtual servers is executed on a physical server, or may be physical servers.

In the example server infrastructure 100 of FIG. 1, the servers 101 are located in two remote server farms 110 and 120. The server farm 110 thereby comprises two fire cells, i.e. fire cell A 1101 and fire cell B 1102. The server farm 120 only comprises one fire cell C 1201. The fire cell A comprises three servers 101: server A1, server A2, and server A3. The fire cell B comprises two servers 101: server B1 and B2. Finally, the fire cell C comprises three servers 101: server C1, server C2, and server C3.

The server infrastructure 100 also comprises a central control unit 130 that is connected to a plurality of client terminals 140. The central control unit 130 includes a processor, a memory and a network interface to communicate with the client terminals 140. The client terminals 140 may be personal computers, laptop computers, tablet computers, mobile phones, or any other suitable computing devices.

The client terminals 140 include a processor, a memory and a network interface. Furthermore, they include a display, a user interface control unit and/or an alpha-numeric and cursor input device. The client terminals 140 may connect to the central control unit 130 through one or more private or public networks, e.g. the Internet or a local area network. Requests sent from client terminals 140 to the server environment 110 are routed from the central control unit 130 to those servers 101 that execute applications required to fulfill the requests.

Other server infrastructures than the server infrastructure 100 are possible. The servers 101 may for example be located in one location without using different fire cells. Alternatively, the servers 101 may be spread over a plurality of server farms, wherein each server farm, which may or may not be located remotely, comprises one of more fire cells. The client terminals 140 may be connected to another computing system (not shown), for example an API Gateway server or a Web server, which then routes the requests to the central control unit 130 for further processing.

The following examples are based on the server infrastructure 100 of FIG. 1 with its fire cells A, B, and C and the respective servers A1, A2, A3, B1, B2, C1, C2, and C3.

Figure 2A:
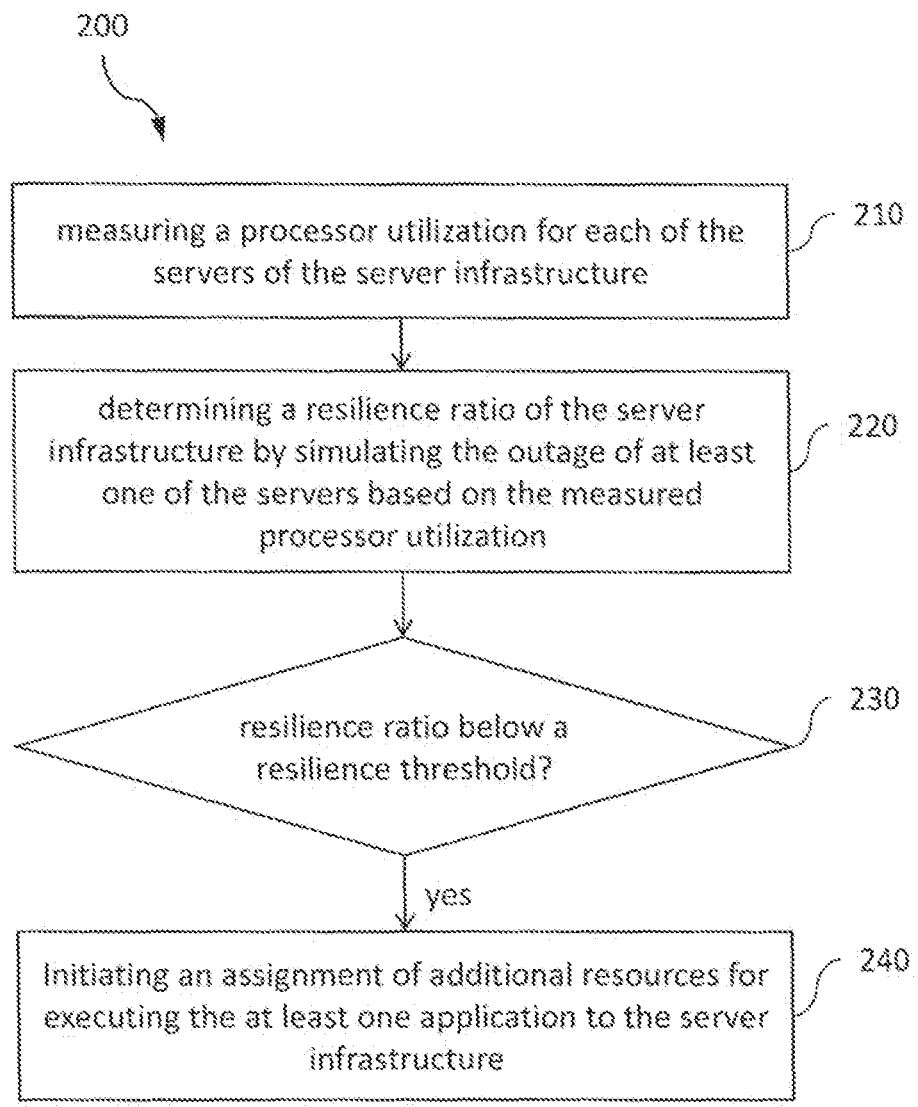
FIG. 2a shows a flowchart of the basic method as described herein.

The method 200 of FIG. 2a for testing and maintaining outage resilience of server resources of a server infrastructure by means of a hybrid simulation is performed in a server infrastructure 100 as depicted in FIG. 1. Hybrid simulation combines physical measuring and computer modeling. Hence, the method described herein combines measured historical data of the underlying server infrastructure 100 with a simulation of outages. Therefore, the method 200 starts with measuring a processor utilization for each of the servers 101 of the server infrastructure 100 in box 210. As most of the operating systems are already capable of measuring the processor utilization of a computing system, the processor utilization may be directly extracted from statistics calculated by the operating system. Alternatively or additionally, a separate tool may be programmed to determine the processor utilization.

The measured processor utilization may be stored on separate database servers, on the memory of the computing system comprising the central control unit 130 or in other suitable manner. If historical data is outdated, e.g. because a monitored server has been replaced by another, the applications being executed on the servers 101 have been changed, the elapsed time from the measured data exceeds an outdating threshold, or the like, the respective data may be deleted and data from newer measurements may be taken into account.

In box 220, a resilience ratio of the server infrastructure 100 is determined. This is done by simulating a hypothetical outage of at least one of the servers that executes a plurality of applications based on the measured processor utilization. Such simulation may be run on a specific simulation computing system or on a high-performance computing system depending on the dimensions of the monitored server infrastructure 100 and the required computational resources. Parameters of the simulation, such as the type, processor, memory etc. of the monitored servers 101, as well as the measured processor utilization may be extracted directly from stored data. The method may also provide a human computer interface to input and/or select those values.

After having simulated an outage or a plurality of outages, the simulation may return a resilience ratio of the server infrastructure 100 with respect to the simulated outages. This resilience ratio may be a value between 0 and 1, wherein 1 means completely resilient and 0 not resilient. Thus, a server infrastructure 100 that has a simulated resilience ratio of 0.9 when simulating an outage of one of its servers 101 is very likely to be able to compensate an outage of that one server without any problems. Alternatively, the resilience ratio may be a resulting unused processor utilization of remaining servers when executing the load of at least one of the plurality of applications. Other values are possible and the calculation and structure of the resilience ratio may depend on the usage and architecture of the server infrastructure 100.

If the resilience ratio is below a resilience threshold (box 230), i.e. that there is not enough resilience of the server infrastructure 100 against an outage of at least one of the servers 101, additional resources for executing at least one of the plurality of applications to the server infrastructure 100 are initiated to be assigned (box 240). Any suitable resilience threshold may be applied, e.g. 0.1, 0.2, 0.3, 0.4, or alternatively 20%, 30%, 40%, as well as any other suitable value, and/or may depend on the calculation method of the resilience ratio and the architecture and implementation of the server infrastructure 100. For example, if an outage of a server 101 that executes application X leads to a resilience ratio of 0.2, which is below a possible predetermined resilience threshold of 0.3, additional servers 101 may be automatically or manually assigned to execute the application X. The method 200 may therefore also provide an output on a computer screen indicating the need to assign more resources to the server infrastructure 100.

FIG. 2b depicts a Table 250 of a basic example of applying the method 200 of FIG. 2a on the example server infrastructure 100 of FIG. 1 with fire cells A, B, and C, shown in line 251. It is assumed that all servers A1 to C3, shown in line 252, execute the same application and are equally equipped with regard to central processing unit, graphic processing unit, memory capacity, and memory type. Line 253 shows the measured processor utilization. This may be the averaged or maximum processor utilization of the servers 101 measured during a time interval.

The processor utilization is usually measured in percent of the maximum possible processor utilization or processor capacity. In other words, a processor capacity could be mapped to 100 processor units and the measured processor utilization could be directly mapped from the percentage to the number of utilized processor units. The total number of utilized processor units of each fire cell is shown in line 254.

The table 250 further shows the simulation of an outage of fire cell B, i.e. of servers B1 and B2, shown in line 255. To calculate the resilience ratio against an outage of fire cell B, it has to be determined whether the remaining servers are able to additionally handle the load of the servers that are simulated to be out of order. Therefore, the total number of utilized processor units of all servers before outage have to be determined, which are 115+60+145=320. Then, these are equally distributed among all remaining servers resulting in a simulated processor utilization of 53.3 for each server, which is shown in line 256. Finally, the resilience ratio, which is in this example the free processor capacity of each server and shown in line 257, is 46.7.

Therefore, the formula for the resilience ratio R for n equally equipped servers when simulating an outage of o servers is given by:

$$R = 1 - \frac{\sum_{k=1}^{n} mpu_k}{100*(n-o)}$$

Thereby, mpuk, denotes the measured processor utilization for server k.

For example, if a predetermined resilience threshold for the resilience ratio is set to 0.3, i.e. a minimum of 30 percent of free processor utilization on each remaining server 101 is required to flag the server infrastructure 100 as being resilient, the server infrastructure 100 in the example of FIG. 2b would be considered resilient and would not require any actions.

Figure 3A:
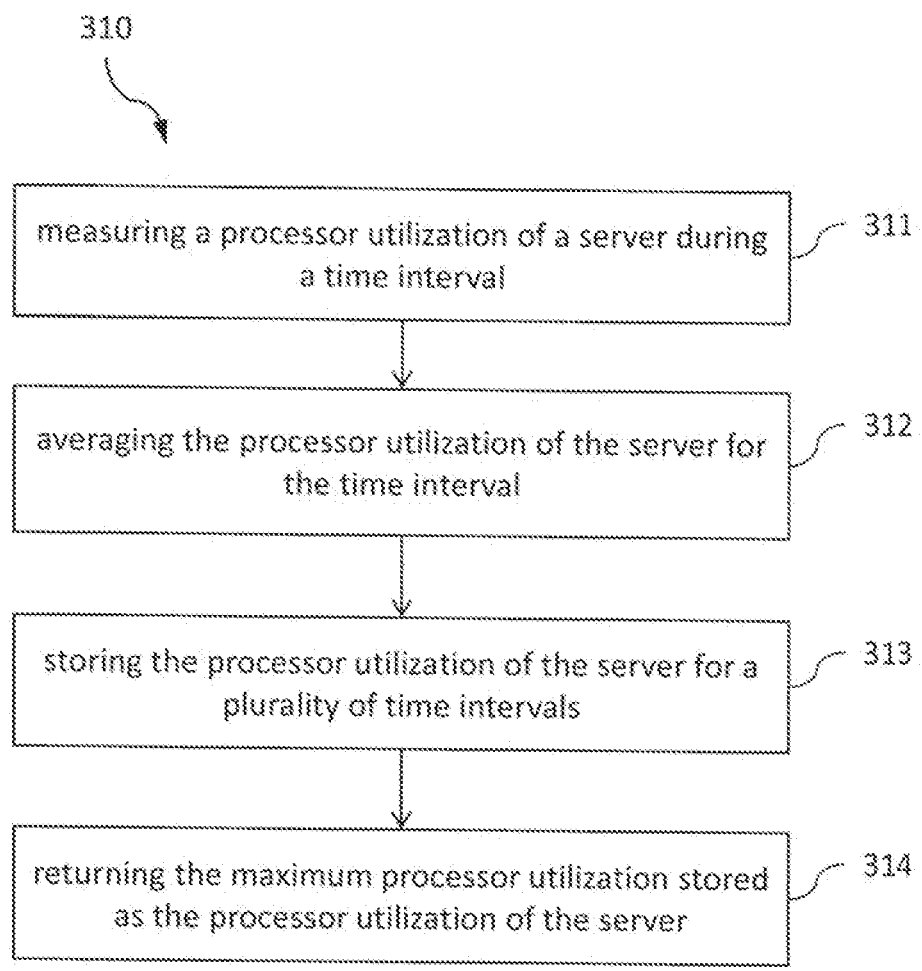
FIG. 3a shows a flowchart of example processes when measuring a processor utilization.

The method 310 of FIG. 3a shows example processes when measuring a processor utilization—for example to be included in the process of box 210 of FIG. 2a—according to an embodiment. The method starts with measuring a processor utilization of a server 101 during a time interval in box 311. For example, the processor utilization may be measured every second during a time interval of 30 seconds, every minute during a time interval of 60 minutes, or any at any other points in time during any other suitable time interval.

Then, in box 312, the processor utilization of the server 101 is averaged for the time interval to obtain a mean processor utilization. This is done and stored for a plurality of time intervals (box 313). Finally, the maximum mean processor utilization that has been stored is returned to the simulation as the measured processor utilization of the server (box 314).

Figure 3B:
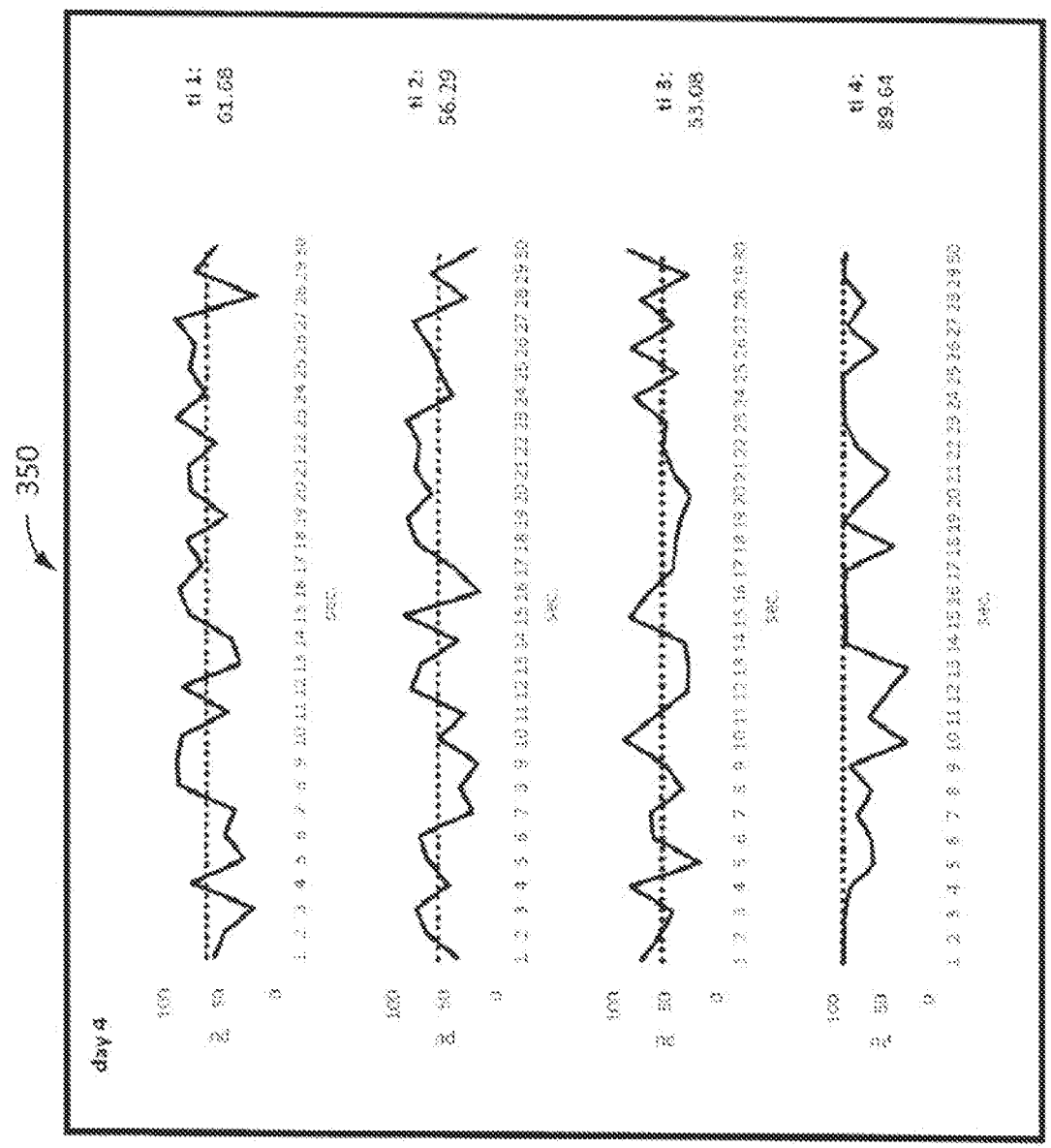

FIG. 3b depicts graphs of example values measured with the method 310 of FIG. 3a. The charts 350 show the measured processor utilization (pu) for server A1 during four subsequent time intervals (ti) of 30 seconds during day 4 of a plurality of days, e.g. of a week. For example, during time interval 1 (ti 1), the averaged processor utilization is 61.68.

FIG. 3c shows two tables with example values measured with the method 310 of FIG. 3a. Table 360 comprises the averaged processor utilization values for all time intervals measured during day 4 for the servers 101 in fire cells A and B. For each day and each server, the maximum processor utilization is then determined. For example, the maximum processor utilization of server A1 on day 4 is 89.64 measured in time interval 4. The averaging process and/or maximum selecting process may be repeated. Thus, as shown in Table 370, the determined maximum processor utilizations of Table 360 may be stored and the maximum value of all servers 101 in the corresponding week, in this example 89.81, may be taken as measured processor utilization for the servers 101 when simulating an outage.

Other methods for determining of the measured processor utilization may also be applied. For example, determining the maximum processor utilization may not based on a single server basis, as described with regard to FIGS. 3b and 3c, but based on an overall processor utilization of a plurality of servers that are all assigned for execution of an application. In the example of Table 370 of FIG. 3c, if assumed that all servers execute one application, the highest over-all/mean processor utilization of the week was measured on day 4 with a value of 79.72. Then, the measured processor utilization of each server measured on this day, e.g. 89.64 for server A1, 80.92 for server A2 . . . , is taken as measured processor utilization when simulating an outage.

Figure 4A:
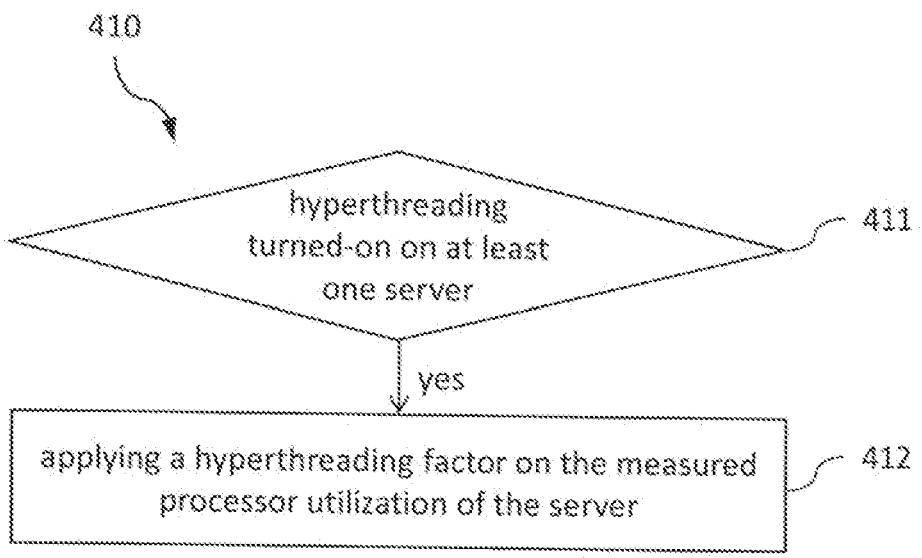
FIG. 4a shows a flowchart of an example process when measuring a processor utilization if hyperthreading is taken into account.

FIG. 4a depicts a flowchart of an example process 410 when measuring a processor utilization, which may be included in the process of box 210 of FIG. 2, if hyperthreading of at least one server 101 is activated and is, thus, taken into account. If hyperthreading is turned-on on a server 101, the processors are virtually doubled. So, for example, servers 101 with dual-core processors will act as if they are quad-core. Thus, the measured virtual processor utilization does not correspond to the real processor capacity and utilization. Hence, it is needed to apply a hyperthreading factor on the measured processor utilization. Therefore, the method 410 first determines whether hyperthreading is turned-on on a server (box 411). If so, a hyperthreading factor is applied on the measured processor utilization of the server, shown in box 412.

Figure 4B:
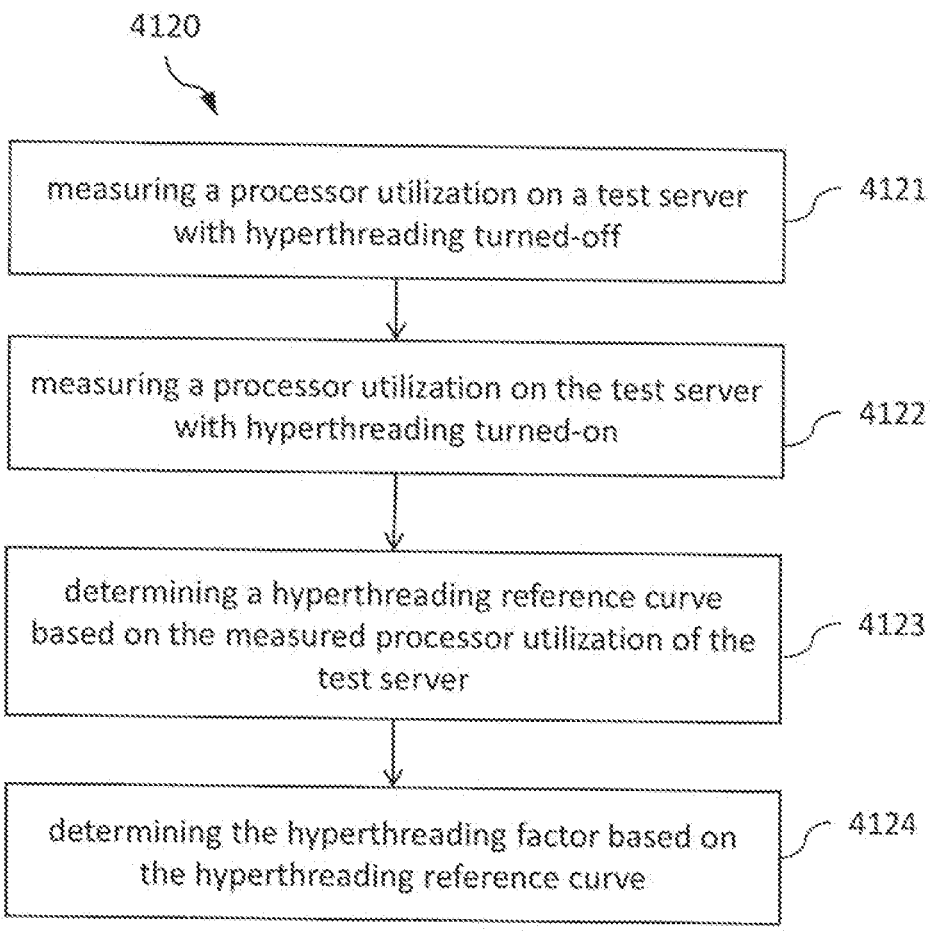
FIG. 4b shows a flowchart of how a hyperthreading factor for the example process of FIG. 4a can be determined.

However, there is no simple way to determine the hyperthreading factor since it depends on the type and equipment of the processor and/or on the application that is executed. A method 4120 for determining the hyperthreading factor for the example process in box 412 of FIG. 4a is shown in FIG. 4b. The method 4120 starts with measuring a processor utilization on a test server with hyperthreading turned-off in box 4121.

Then, in box 4122, the processor utilization on the test server is measured with hyperthreading turned-on. To enable comparability between the measured processor utilization with and without hyperthreading, the test server executes the same application during the measurements, i.e. identical workload is distributed to the test server with and without hyperthreading. A load balancer may mirror incoming traffic, i.e. transactions on the testserver. As a next process (box 4123), a hyperthreading reference curve based on the measured processor utilization of the test server with and without hyperthreading is determined. Finally, the hyperthreading factor to be applied can be determined based on the hyperthreading reference curve (box 4124).

If a server infrastructure like the server infrastructure 100 comprises differently equipped servers 101 with regard to at least one of central processing unit, graphic processing unit, memory capacity, and memory type, different hyperthreading reference curves may be determined for each of the servers 101. Alternatively, one hyperthreading reference curve may be applied to all servers 101 without taking the differences into account.

Figure 4C:
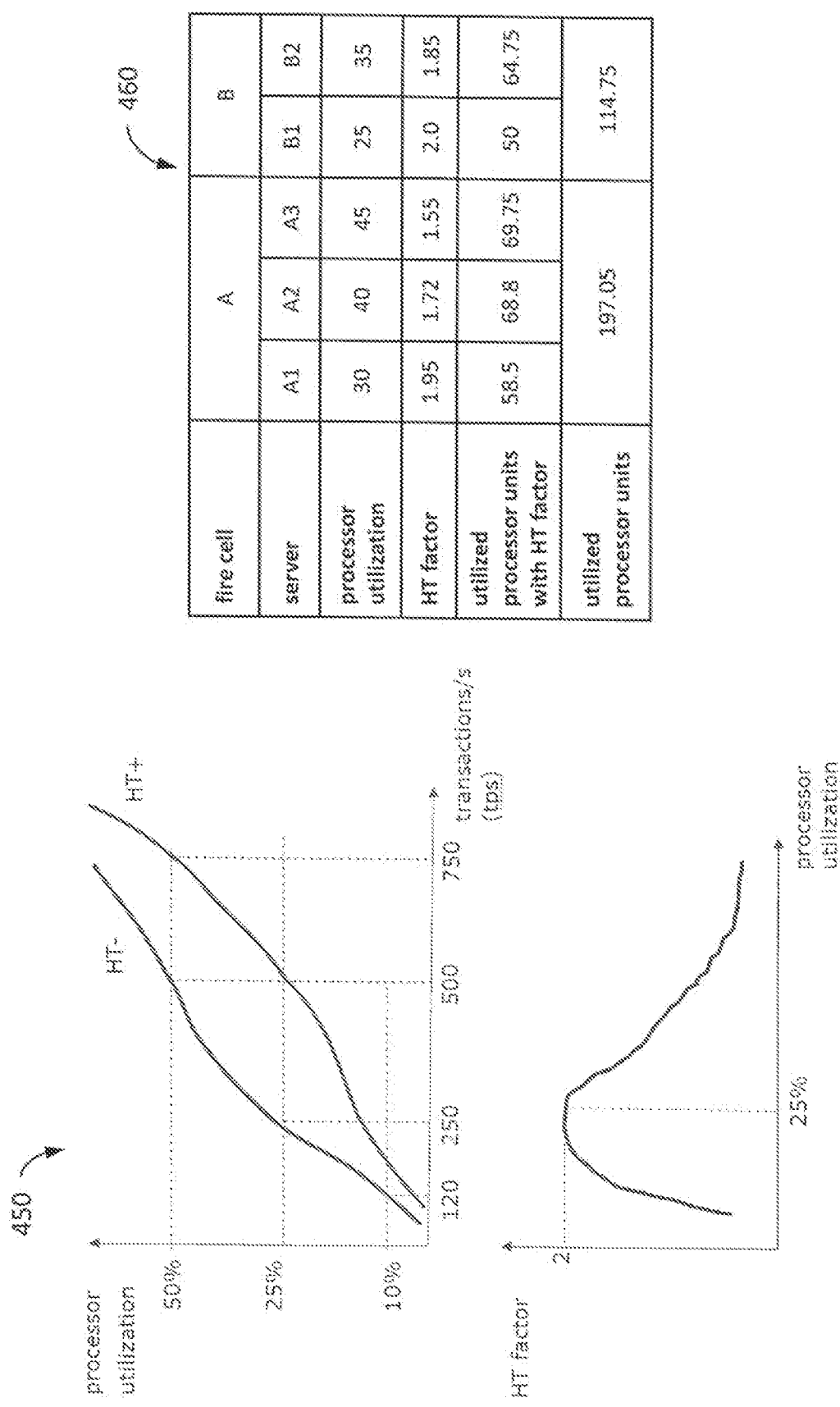
FIG. 4c depicts an example of determining hyperthreading factors and corresponding example values for the server infrastructure of FIG. 1.

FIG. 4c shows an example of determining hyperthreading factors. The graphs 450 illustrate on example graphs how a hyperthreading factor is determined. The graph on the top shows the measured processor utilization with (HT+) and without (HT−) hyperthreading for different computational loads measured in transactions per second (tps).

The graph on the bottom shows the resulting hyperthreading curve that is determined by dividing the measured processor utilization with (HT+) and without (HT−) hyperthreading for same computational loads. For example, when measuring 25% processor utilization with hyperthreading turned-on, the test server is able to process 500 transactions per second. However, when hyperthreading is turned-off, the test server shows 50% processor utilization when processing 500 transactions per second. This leads to a hyperthreading factor of 2. As another example, when measuring 15% processor utilization with hyperthreading turned-on, the test server is able to process 250 transactions per second. However, when hyperthreading is turned-off, the test server shows 25% processor utilization when processing 250 transactions per second. This leads to a hyperthreading factor of 1.7.

Table 460 shows corresponding example values for the server infrastructure 100 of FIG. 1. It is assumed that all servers 101 have hyperthreading turned-on. As the hyperthreading factor is different for different measured processor utilizations, the hyperthreading factors applied are also different. For example, server A3 has a measured processor utilization of 45%. The hyperthreading factor for 45% is 1.55, which leads to a number of 69.75 utilized processor units with applied hyperthreading factor. As another example, server B1 has a measured processor utilization of 25%. The hyperthreading factor for 25% is 2.0, which leads to a number of 50 utilized processor units with applied hyperthreading factor.

Figure 5A:
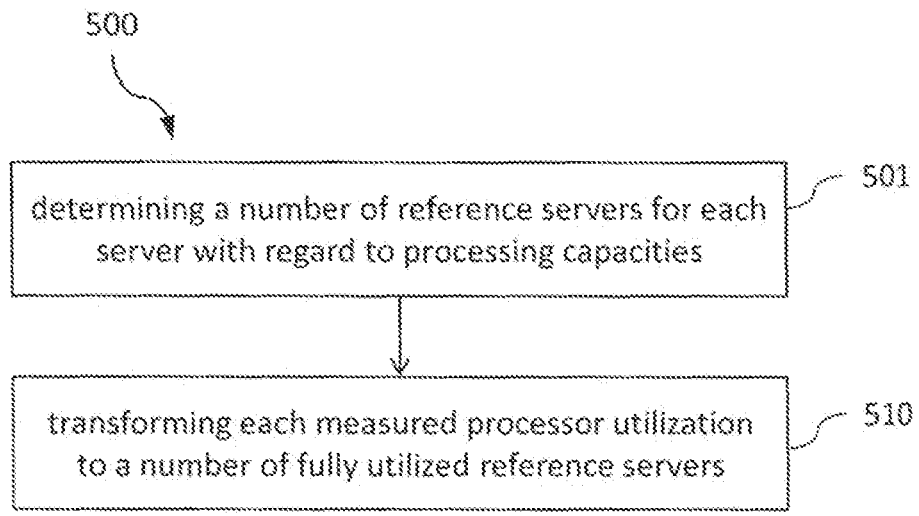
FIG. 5a shows a flowchart of an example process when the servers are differently equipped with regard to at least one of central processing unit, graphic processing unit, memory capacity, and memory type.

FIG. 5a shows an example method 500 when the servers, such as the servers 101 in the server infrastructure 100, are differently equipped with regard to at least one of central processing unit, graphic processing unit, memory capacity, and memory type. In dynamic server environments, in which changes such as adding new servers or replacing older servers with newer ones, or the like, occur regularly, many different types of servers are present. Therefore, a measured processor utilization of one server may represent a much higher or lower amount of computational load than the same measured processor utilization of another one.

To enable a reliable monitoring and evaluation of such an environment, a reference server is introduced. This reference server may be a hypothetical server with a predefined processing power. The reference server may also be a server with specified components, such as for example CPU type, GPU type, or memory type, for which the processing power has been determined in experiments before. Moreover, the determination of reference server can also be based on the 'SPECint computer benchmark' or on a reference cores concept using the 'per physical core SPECrate output' of a server.

The method 500 starts in box 501 with determining a number of reference servers for each server with regard to processing capacities. For example, if server A1 has 5.3 times the processing power of the predetermined reference server, server A1 will be mapped to 5.3 reference servers.

When the number of reference serves is known, the measured processor utilization of each server 101 can be transformed to a number of fully utilized reference servers (box 510). The process of box 510 may be included in process 210 in FIG. 2a. On the previous example, if the measured processor utilization of server A1 is 30%, the number of fully utilized reference servers would be 1.59. Hence, the number of fully utilized reference servers #furs is calculated based on the number of reference servers #rs and the measured processor utilization mpu with the following formula:

$$\#furs = \#rs * mpu$$

Figure 5B:
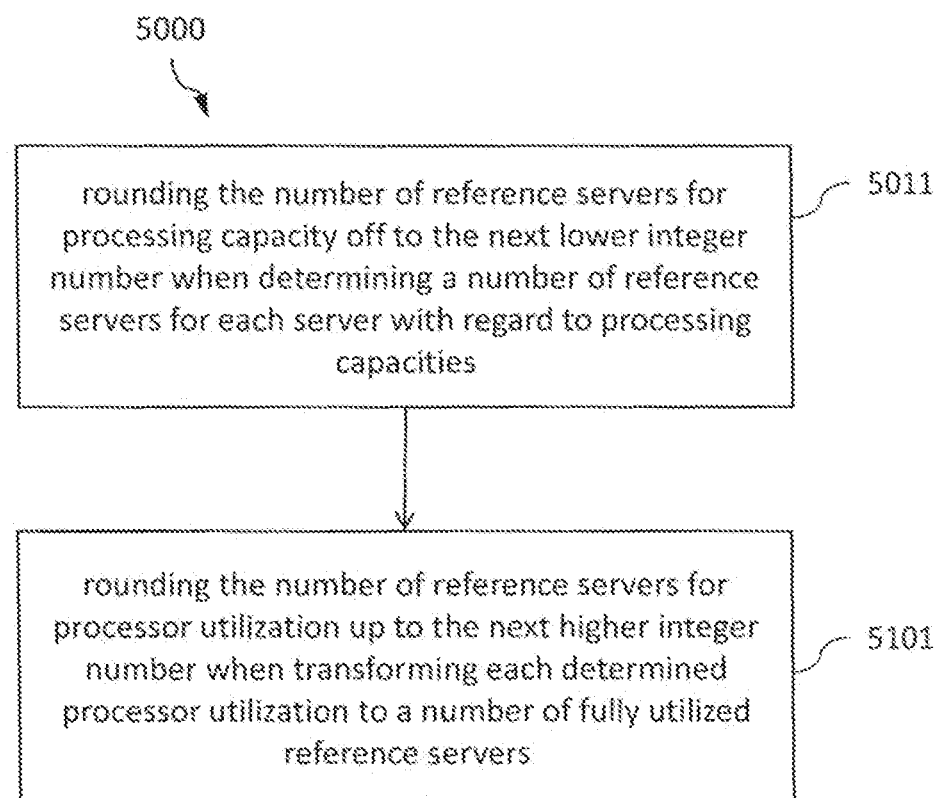
FIG. 5b shows a flowchart of how to determine the number of reference servers in integer numbers.

In some cases, it might be preferred to do all calculations on integer numbers that enables the use of dedicated processing units for speeding the calculations up. Therefore, method 5000 of FIG. 5b presents two further processes for combination with the method 500. First (box 5011), the number of reference servers for determining the processing capacity, i.e. the installed capacity expressed in reference servers, is rounded off to the next lower integer number. This process is a sub-process for the process of box 501 in FIG. 5a. On the above given example, if the server A1 has 5.3 times the processing power of the predetermined reference server, server A1 will be mapped to 5 reference servers. Thus, the resulting formula for the number of reference servers in integers #int_rs is:

$$\#int\_rs = \lceil \#rs \rceil$$

Secondly (box 5101), the number of reference servers for determining the processor utilization, i.e. the used capacity expressed in reference servers, is rounded up to the next higher integer number. This process is a sub-process for the process of box 510 in FIG. 5a. Again, on the example given above, if the measured processor utilization of server A1 is 30%, the number of fully utilized reference servers would be 2. Rounding the number of reference servers off and the fully utilized reference servers up introduces a buffer that further increases the security and reliability of the monitoring. The resulting formula to calculate the number of fully utilized reference servers in integers #intjurs is:

$$\#int\_furs = \lceil \#int\_rs * mpu \rceil$$

FIG. 5c depicts a Table 550 of example values when applying the processes of the methods 500 and 510 for the server infrastructure 100 of FIG. 1. Lines 551 and 552 are the header lines defining the respective fire cell and server. In line 553, the number of reference servers for each server A1 to C3 is shown. This value may be determined once a server 101 is added to the server infrastructure 100. As the method 510 is applied, all values referring to reference servers are integers.

Line 554 depicts the measured processor utilization for each server 101. In this example, it is assumed that no server 101 uses hyperthreading. The measured processor utilization is then transformed to a number of fully utilized reference servers (line 555), which is for visualization summed for each fire cell in line 556. In the example of Table 550, an outage of fire cell B with servers B1 and B2 is simulated. This leads to a mean simulated processor utilization (line 557) of 65.5% and to a resilience ratio of 34.5 (line 559).

Therefore, the formula for determining the resilience ratio R for n servers when simulating an outage of o servers is given by:

$$R = 1 - \frac{\sum_{k=1}^{n} \#furs_k}{\sum_{k=1}^{n-o} \#rs_i}$$

Thereby, $\#furs_k$ denotes the number of fully utilized reference servers for server k and $\#rs_i$ denotes the number of reference servers for remaining server i, wherein server i is not affected by the outage.

Figure 6:
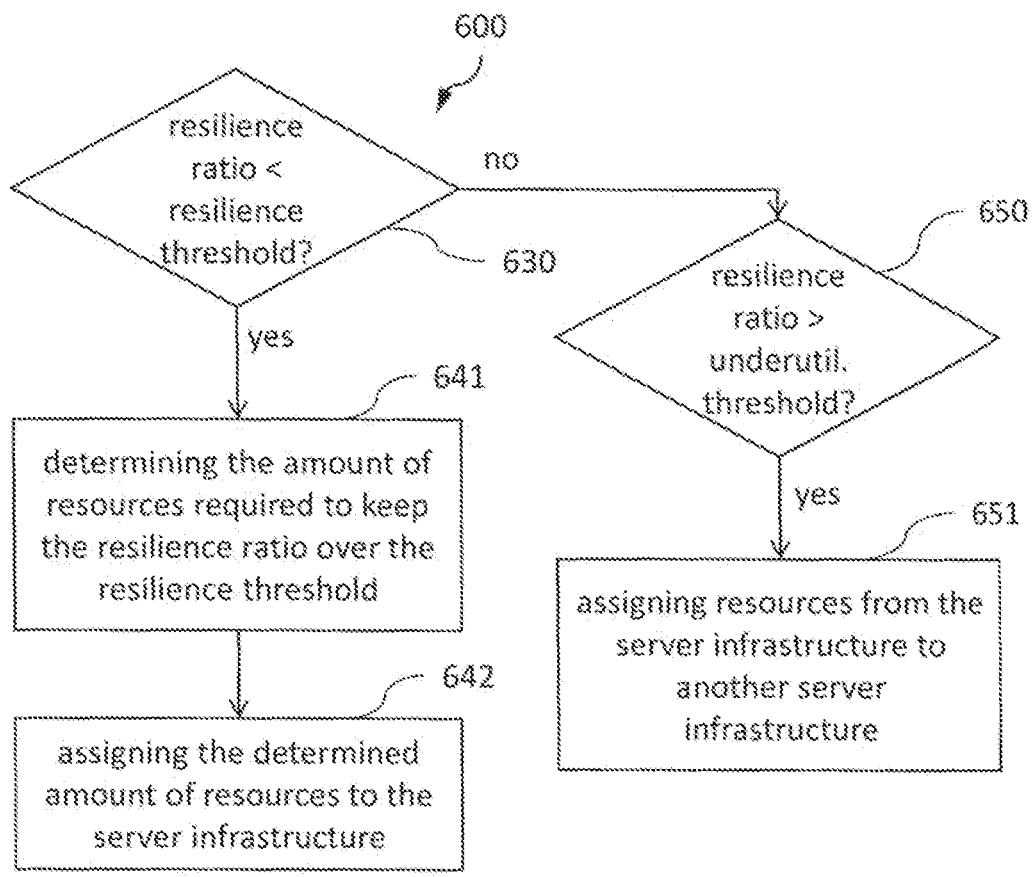
FIG. 6 shows a flowchart of example processes in case of the resilience ratio being lower than the resilience threshold or higher than underutilization threshold.

FIG. 6 depicts example processes in case of the resilience ratio being lower than the resilience threshold or higher than underutilization threshold. The method 600 starts with comparing whether the resilience ratio is lower than the resilience threshold in box 630. This is the same decision process as e.g. the decision process in box 230 of FIG. 2a. If the resilience ratio is below this resilience threshold, i.e. the server infrastructure 100 would be considered to be not resilient, the amount of resources required to keep the resilience ratio over the resilience threshold is determined (box 641). For example, if the resilience ratio is determined to be 0.2 for an outage of server(s) $S_1$ to $S_n$ but the resilience threshold is set to 0.3, it will be determined how many resources, e.g. additional servers, must be added to achieve a resilience ratio equal or higher than 0.3.

The determined amount of resources will then be assigned to the server infrastructure (box 642). For example, if it has been determined that additional resources of two more servers are needed to keep the resilience ratio over the resilience threshold, then two more servers are assigned to execute the respective application. The processes of boxes 641 and 642 may for example be included in the process 240 of FIG. 2a.

Alternatively or additionally, if the resilience ratio is already higher than required, i.e. than the resilience threshold, it may be compared whether the resilience ratio exceeds an underutilization threshold (box 650). If so, resources from the server infrastructure 100 may be initiated to be assigned to another server infrastructure. This additional underutilization threshold will usually be predefined like the resilience threshold. For example, the underutilization threshold may be set to 0.5. If the resilience ratio exceeds 0.5 meaning that—even in case of the simulated outage—half of the remaining processing resources are still unused, resources, e.g. servers, may be assigned from the server infrastructure 100 to another server infrastructure. This enables a dynamic, secure and resilient management of the computational resources in a plurality of server infrastructures.

If the server infrastructure 100 comprises a plurality of fire cells, remote locations, and/or applications being executed in a distributed way, it may not suffice to only simulate an outage of one fire cell, one location, one server or such. There may be the need to determine an overall resilience ratio for all outage scenarios, for a specific combination of outage scenarios, or the like.

Figure 7:
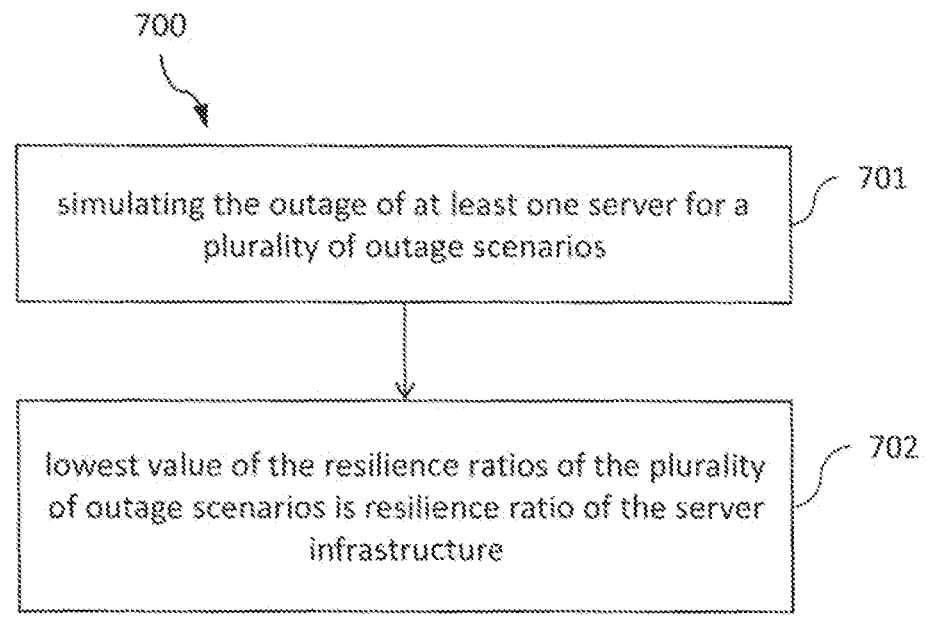
FIG. 7 shows a flowchart of example processes when the method described herein is used for a plurality of outage scenarios.

FIG. 7 shows a method 700 comprising additional processes for covering this problem. Therefore, the outages of different servers 101, i.e. different outages scenarios are simulated (box 701) with the methods described herein. For each of these simulated scenarios, a resilience ratio is determined as described in the above embodiments. Then, the lowest value of these resilience ratios is taken as resilience ratio of the server infrastructure 100 (box 702) with respect to the simulation of different outage scenarios. Thereby, a server infrastructure can be monitored and tested to ensure availability and, thus, resilience against outages.

FIG. 8 finally depicts example values for the server infrastructure 100 of FIG. 1 including most of the described embodiments. Here, the server infrastructure 100 executes three applications I, II, and III in a distributed manner on the eight servers A1 to C3 in three fire cells A, B, and C. The servers 101 are differently equipped; thus, the processing capacity is transformed to a number of reference servers and the measured processor utilization to a number of fully utilized reference servers. Moreover, the servers 101 all have hyperthreading turned-on and, hence, a hyperthreading factor is applied.

The table 800 shows the values for an outage of fire cell B. The server B1 executes application II, server B2 application I. Thus, an outage of fire cell B only affects the execution of applications I and II. It can be seen that the resilience ratio for application II is −12.5. This means that the remaining servers that execute application II when fire cell B is out of order cannot handle the execution of application II alone. Therefore, the server infrastructure 100 would not be resilient against an outage of fire cell B with regard to application II.

Additionally, the resilience ratio for application I is only 8.3. Thus, even with a resilience threshold of only 10, the server infrastructure 100 would also not be resilient against an outage of fire cell B with regard to application I. In the example of FIG. 8, the server infrastructure 100 would have an overall resilience ratio of −12.5 and would, thus, require to assign additional resources to be resilient against an outage of fire cell B.

All publications and existing systems mentioned in this specification are herein incorporated by reference. Although certain methods and products constructed in accordance with the teachings of the invention have been described herein, the scope of coverage of this patent is not limited thereto.

The invention claimed is:

1. A method of testing and maintaining outage resilience of server resources of a server infrastructure by means of a hybrid simulation, wherein the server infrastructure comprises a plurality of servers executing a plurality of applications, wherein the method comprises:
measuring a processor utilization for each of the servers of the server infrastructure;
determining a resilience ratio of the server infrastructure by simulating the outage of at least one of the servers based on the measured processor utilization; and
in response to the resilience ratio of the server infrastructure falling below a resilience threshold, initiating an assignment of additional resources for executing at least one of the plurality of applications to the server infrastructure.

2. The method of claim 1, wherein the resilience ratio is determined for each of the executed applications separately.

3. The method of claim 1, wherein the servers are located in at least two different fire cells.

4. The method of claim 1, wherein the servers are located in at least two distant locations.

5. The method of claim 1, wherein measuring a processor utilization of a server comprises:
measuring a processor utilization of a server during a time interval;
averaging the processor utilization of the server for the time interval;
storing the processor utilization of the server for a plurality of time intervals; and
returning the maximum processor utilization stored as the processor utilization of the server.

6. The method of claim 1, wherein at least one server of the server infrastructure has the capability to use hyperthreading and hyperthreading is turned-on on the at least one server, and measuring a processor utilization of a server comprises applying a hyperthreading factor on the measured processor utilization of the server.

7. The method of claim 6, wherein the hyperthreading factor is determined from a hyperthreading reference curve, wherein the hyperthreading reference curve is determined based on measuring a processor utilization on a test server with hyperthreading turned-off and a processor utilization on the test server with hyperthreading turned-on while the test server executes equal tasks.

8. The method of claim 1, wherein at least two servers are differently equipped with regard to at least one of central processing unit, graphic processing unit, memory capacity, and memory type, and wherein the method further comprises:
determining a number of reference servers for each server with regard to processing capacities; and
transforming each measured processor utilization to a number of fully utilized reference servers.

9. The method of claim 8, wherein the number of reference servers for a server is rounded off to the next lower integer number and wherein the number of reference servers for a processor utilization of a server is rounded up to the next higher integer number.

10. The method of claim 1, wherein the resilience ratio is a resulting unused processor utilization of remaining servers when executing the load of at least one of the plurality of applications.

11. The method of claim 1, wherein initiating the assignment of additional resources for executing at least one of the plurality of applications to the server infrastructure comprises:
determining the amount of resources required to keep the resilience ratio over the resilience threshold; and
assigning the determined amount of resources to the server infrastructure.

12. The method of claim 1, further comprising:
in response to the resilience ratio exceeding an underutilization threshold, assigning resources from the server infrastructure to another server infrastructure.

13. The method of claim 1, wherein simulating the outage of at least one server is performed for a plurality of outage scenarios and wherein the resilience ratio of the server infrastructure is the lowest value of the resilience ratios of the plurality of outage scenarios.

14. A system of testing and maintaining outage resilience of server resources of a server infrastructure, wherein the server infrastructure comprises a plurality of servers executing a plurality of applications, wherein the system is at least indirectly connected to all servers of the server infrastructure and arranged to fulfil the method of claim 1.

15. A computer program product comprising code instructions stored on a non-transitory computer-readable medium comprising computer-readable program instructions for performing the method of claim 1, when said program instructions are executed on a computer.

* * * * *